US012594713B2

(12) United States Patent
Wegst et al.

(10) Patent No.: US 12,594,713 B2
(45) Date of Patent: Apr. 7, 2026

(54) THREE-DIMENSIONAL FREEZE EXTRUSION FOR THE MANUFACTURE OF HOMOGENEOUS AND GRADED RODS AND TUBES

(71) Applicant: Trustees of Dartmouth College, Hanover, NH (US)

(72) Inventors: Ulrike G. K. Wegst, Hanover, NH (US); Kaiyang Yin, West Lebanon, NH (US); Claire Adner, Hanover, NH (US); Peyton Weber, Hanover, NH (US); Amalie Hildebrandt Brynjulfsson, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 18/136,940

(22) Filed: Apr. 20, 2023

(65) Prior Publication Data

US 2023/0347574 A1 Nov. 2, 2023

Related U.S. Application Data

(63) Continuation of application No. 17/176,058, filed on Feb. 15, 2021, now abandoned.

(Continued)

(51) Int. Cl.
*B29C 64/106* (2017.01)
*B29C 64/209* (2017.01)
(Continued)

(52) U.S. Cl.
CPC .......... *B29C 64/106* (2017.08); *B29C 64/209* (2017.08); *B29C 64/255* (2017.08);
(Continued)

(58) Field of Classification Search
CPC ... B29C 64/106; B29C 64/112; B29C 64/314; B29C 64/255; B29C 64/209; B29C 64/393; B29L 2023/22
See application file for complete search history.

(56) References Cited

U.S. PATENT DOCUMENTS 4,680,156 A * 7/1987 Collier .................... B29C 48/86
264/209.6
6,447,701 B1 9/2002 Heschel et al.
(Continued)

FOREIGN PATENT DOCUMENTS

CN 208250482 U 12/2018
CN 109989119 A 7/2019
(Continued)

OTHER PUBLICATIONS

Bai et al. ("A Thermally Insulating Textile Inspired by Polar Bear Hair", Advanced Materials, 2018, 30, 1706807) (Year: 2018).*
(Continued)

*Primary Examiner* — Ariella Machness
(74) *Attorney, Agent, or Firm* — Hamilton, Brook, Smith & Reynolds, P.C.

(57) ABSTRACT

In an aspect, the present disclosure pertains to a method of making a material. Generally, the method includes one or more of the following steps of: (1) placing a mixture having one or more components in a container; and (2) extruding the mixture out of at least one opening of at least one nozzle. In an additional aspect, the present disclosure pertains to a material. In some embodiments, the material includes one or more components. In some embodiments, the one or more components are in the form of a multi-layered structure.

21 Claims, 11 Drawing Sheets

Related U.S. Application Data

(60) Provisional application No. 62/976,734, filed on Feb. 14, 2020.

(51) Int. Cl.

| | |
|---|---|
| *B29C 64/255* | (2017.01) |
| *B29C 64/314* | (2017.01) |
| *B29C 64/393* | (2017.01) |
| *B29L 23/00* | (2006.01) |
| *B33Y 10/00* | (2015.01) |
| *B33Y 40/10* | (2020.01) |
| *B33Y 50/02* | (2015.01) |
| *B33Y 80/00* | (2015.01) |

(52) U.S. Cl.
CPC .......... *B29C 64/314* (2017.08); *B29C 64/393* (2017.08); *B33Y 10/00* (2014.12); *B33Y 40/10* (2020.01); *B33Y 50/02* (2014.12); *B33Y 80/00* (2014.12); *B29L 2023/22* (2013.01)

(56) References Cited

U.S. PATENT DOCUMENTS

| | | | |
|---|---|---|---|
| 8,557,163 | B2 | 10/2013 | Chian et al. |
| 8,877,498 | B2 | 11/2014 | Wegst et al. |
| 10,315,246 | B2 | 6/2019 | Wegst et al. |
| 2015/0290861 | A1 | 10/2015 | Douglass et al. |
| 2015/0307385 | A1 | 10/2015 | Klein et al. |
| 2017/0196237 | A1 | 7/2017 | Wegst |
| 2018/0153734 | A1 | 6/2018 | Wegst et al. |
| 2019/0099939 | A1* | 4/2019 | Ahn ......................... B22F 12/53 |
| 2019/0142995 | A1* | 5/2019 | Ahn ......................... A61L 27/38 |
| | | | 264/129 |
| 2020/0208303 | A1* | 7/2020 | Bai ......................... D01D 10/02 |
| 2020/0331067 | A1 | 10/2020 | Reese et al. |
| 2021/0252773 | A1 | 8/2021 | Wegst et al. |

FOREIGN PATENT DOCUMENTS

| | | | | |
|---|---|---|---|---|
| CN | 110359106 | A | | 10/2019 |
| CN | 110387590 | A | | 10/2019 |
| CN | 110387592 | A | * 10/2019 | ........... C08F 120/14 |
| CN | 110409006 | A | | 11/2019 |
| CN | 110438586 | A | | 11/2019 |
| CN | 110512300 | A | | 11/2019 |
| CN | 110578181 | A | | 12/2019 |
| CN | 110578182 | A | | 12/2019 |
| WO | 2015/179678 | A1 | | 11/2015 |
| WO | WO-2019144897 | A1 | * 8/2019 | ........... B29C 64/209 |

OTHER PUBLICATIONS

Kastyl et al. "Coextrusion of zirconia core-shell rods with controlled porosity in the core", Processing and Application of Ceramics 12 (3), 2018, 230-239. (Year: 2018).*

Yang et al. "Phase change materials (PCM) based cold source for selective freezing 3D printing of porous materials" Int J Ad Manuf Technol, 95, 2019, 214-2155. (Year: 2019).*

Gozen et al. "Prediction of steady-state freeze front position during 3D printing of microstructures" International Journal of Heat and Mass Transfer 115, 2017, 743-753. (Year: 2017).*

Gozen et al. "Micro-extrusion-based additive manufacturing with liquid metals and alloys: Flow and deposition driven by oxide skin mechanics", Extreme Mechanics Letters, 33, 2019, 100554. (Year: 2019).*

Liu et al. ("Multinozzle Low-Temperature Deposition System for Construction of Gradient Tissue Engineering Scaffolds" Journal of Biomedical Materials Research Part B: Applied Biomaterials 88B: 254-263, 2009) (Year: 2009).*

Bai et al. ("A Thermally Insulating Textile Inspired by Polar Bear Hair" Advanced Materials, 30, 1706807, 2018) (Year: 2018).*

Oakes et al. "Development of Extrusion-On-Demand For Ceramic Freeze-Form Extrusion Fabrication", 2009 (Year: 2009).*

Liu et al. "Fabrication and Characterization of 3D-Printed Highly-Porous 3D LiFePO4 Electrodes by Low Temperature Direct Writing Process" Materials 2017, 10, 934 (Year: 2017).*

Moon et al. ("Novel Ceramic/Camphene-Based Co-Extrusion for Highly Aligned Porous Alumina Ceramic Tubes", J. Am. Ceram. Soc., 95, 6, 1803-1806, 2012) (Year: 2012).*

Machine translation of WO2019144897 (Year: 2019).*

Anh, M. et al., Calcium phosphate ceramics with continuously gradient macrochannels using three-dimensional extrusion of bilayered ceramic-camphene mixture/pure camphene feedrod, Ceramics International 42( 2016) 15603-15609.

Anh, M. et al., Design and Production of Continuously Gradient Macro/Microporous Calcium Phosphate (CaP) Scaffolds Using Ceramic/Camphene-Based 3D Extrusion, Materials 2017, 10, 719; doi: 10.3390/ma10070719.

Bang Pham, C., Fai Leong, K., Chiun Lim, T. and Sin Chian, K. (2008), "Rapid freeze prototyping technique in bio-plotters for tissue scaffold fabrication", Rapid Prototyping Journal, vol. 14 No. 4, pp. 246-253.

Chao-Yaug Liao, Wei-Jen Wu, Cheng-Tien Hsieh, Ching-Shiow Tseng, Niann-Tzyy Dai, and Shan-hui Hsu. Design and Development of a Novel Frozen-Form Additive Manufacturing System for Tissue Engineering Applications. 3D Printing and Additive Manufacturing.Dec. 2016.216- 225.http://doi.org/10.1089/3dp.2015.0042.

Choi, et al., Novel Three-Dimensional Extrusion of Multilayered Ceramic/Camphene Mixture for Gradient Porous Ceramics, J. Am. Ceram. Soc., 99 121 395-398 (2016).

Clarke, "The Physics of Ice Cream", Physics Education, 2016, 38 (3) p. 248-253 (Year: 2016).

Cui, Y., Gong, H., Wang, Y., Li, D., Bai, H. (2018) A Thermally Insulating Textile Inspired by Polar Bear Hair. Adv. Mater., 30(14), 1706807.

Deville, S., Saiz, E., Nalla, R.K. & Tomsia, A.P. (2006) Freezing as a path to build complex composites. Science, 311, 515-518.

Deville, S., Saiz, E., Tomsia, A.P. (2006) Freeze casting of hydroxyapatite scaffolds for bone tissue engineering, Biomaterials, 27(32), 5480-5489.

Francis, N.L., Hunger, P.M., Donius, A.E., Wegst, U.G.K. (2017) Wheatley, M.A. Strategies for Neurotrophin-3 and Chondroitinase ABC Release from Freeze-Cast Chitosan-Alginate Nerve- Guidance Scaffolds. J. Tissue Eng. Reaener. Med., 11, 285-294.

Franks, G. et al., Colloidal processing: enabling complex shaped ceramics with unique multiscale structures, J Am Ceram Soc 2017; 100: 458-490.

Hildebrandt Brynjulfsson, A. (2018) Structure-Property-Processing Correlations in Ice-Templated Materials. Independent Study Report, Thayer School of Engineering, Dartmouth College, Hanover, NH, USA.

Lim TC, Chian KS, Leong KF. Cryogenic prototyping of chitosan scaffolds with controlled micro and macro architecture and their effect on in vivo neo-vascularization and cellular infiltration. J Biomed Mater Res A. Sep. 15, 2010;94(4):1303-11.

Liu, et al., Low-temperature deposition manufacturing: A novel and promising rapid prototyping technology for the fabrication of tissue-engineered scaffold, Materials Science and Engineering C 70 (2017) 976-982.

Peng, et al., 3D Printing of Ultralight Biomimetic Hierarchical Graphene Materials with Exceptional Stiffness and Resilience, Adv. Mater. 2019, 31, 1902930.

Prajan Divakar, Kaiyang Yin, Ulrike G.K. Wegst, Anisotropic freeze-cast collagen scaffolds for tissue regeneration: How processing conditions affect structure and properties in the dry and fully hydrated states, Journal of the Mechanical Behavior of Biomedical Materials 90 (2019) 350-364.

Riblett, B.W., Francis, N.L., Wheatley, M.A., Wegst, U.G.K. (2012) Ice-Templated Scaffolds with MicroridgedPores Direct DRG Neurite Growth. Adv. Funct. Mater., 22, 4920-4923.

Song, et al., Biomimetic 3D Printing of Hierarchical and Interconnected Porous Hydroxyapatite Structures with High Mechanical Strength for Bone Cell Culture, Adv. Eng. Mater. 2019, 21, 1800678.

(56)        References Cited

OTHER PUBLICATIONS

Wegst, U.G.K., Bai, H., Saiz, E., Tomsia, A.P., Ritchie, R.O. (2015) Bioinspired Structural Materials. Nat. Mater., 14, 23-36.

Wegst, U.G.K., Schecter, M., Donius, A.E., Hunger, P.M. (2010) Biomaterials by Freeze Casting. Philos. Trans. R. Soc. A, 368, 2099-2121.

Xiong, et al., Fabrication of porous scaffolds for bone tissue engineering via low-temperature deposition, Scripta Materialia 46 (2002) 771-776.

Xu, et al., Strong, Conductive, Lightweight, Neat Graphene Aerogel Fibers with Aligned Pores, ACS Nano 2012, 6, 8, 7103-7113.

Yin, et al., Bamboo-inspired tubular scaffolds with functional gradients, Journal of the Mechanical Behavior of Biomedical Materials 110 (2020) 103826.

Yin, K., Divakar, P., Wegst, U.G.K. (2019) Freeze-casting porous chitosan ureteral stents for improved drainage. Acta Biomater., 84, 231-241.

Yin, K., Divakar, P., Wegst, U.G.K. (2019) Plant-Derived Nanocellulose as Structural and Mechanical Reinforcement of Freeze-Cast Chitosan Scaffolds for Biomedical Applications. Biomacromolecules, 20(10), 3733-3745.

Zhang, et al., 3D Printing of Graphene Aerogels, small 2016, 12, No. 13, 1702-1708.

Zhang, F., et al., Parameter Study on 3D-Printing Graphene Oxidize Based on Directional Freezing, Proceedings of the ASME 2016 International Manufacturing Science and Engineering Conference, MSEC2016, Jun. 27-Jul. 1, 2016, Blacksburg, Virginia, USA.

Zhao, Tool Path Planning for Directional Freezing-Based Three-Dimensional Printing of Nanomaterials, J. Micro Nano-Manuf. Mar. 2018, 6(1): 010905.

Final Office Action for U.S. Appl. No. 17/176,058, "Three-Dimensional Freeze Extrusion for The Manufacture of Homogeneous and Graded Rods and Tubes" dated Oct. 20, 2022.

Office Action for U.S. Appl. No. 17/176,058, "Three-Dimensional Freeze Extrusion for The Manufacture of Homogeneous and Graded Rods and Tubes" dated Apr. 11, 2022.

* cited by examiner

Polymer

Ice slush

Pure water-ice slush

Polymer solution or particle

THREE-DIMENSIONAL FREEZE EXTRUSION FOR THE MANUFACTURE OF HOMOGENEOUS AND GRADED RODS AND TUBES

CROSS-REFERENCE TO RELATED APPLICATIONS

This application claims priority to U.S. patent application Ser. No. 17/176,058, filed on Feb. 15, 2021, which claims priority to U.S. Provisional Patent Application No. 62/976,734, filed on Feb. 14, 2020. The entirety of each of the aforementioned applications is incorporated herein by reference.

STATEMENT REGARDING FEDERALLY SPONSORED RESEARCH

This invention was made with government support under 1538094 awarded by the National Science Foundation and 80NSSC18K0305 awarded by the National Aeronautics and Space Administration. The government has certain rights in the invention.

BACKGROUND

Freeze-casting is a technique for the manufacture of materials. However, with its current mold-based approach, freeze-casting has reached limitations. Various embodiments of the present disclosure seek to address such limitations.

SUMMARY

In an aspect, the present disclosure pertains to a method of making a material. Generally, the method includes one or more of the following steps of: (1) placing a mixture in a container; and (2) extruding the mixture out of the container. In some embodiments, the mixture includes a plurality of different components. In some embodiments, the container has a first end and a second end. In some embodiments, the first end and the second end are on opposite sides of one another. In some embodiments, the second end of the container has at least one opening. In some embodiments, the mixture is extruded out of the at least one opening. In some embodiments, the mixture includes a plurality of layers during the extruding. In some embodiments, the extruding includes freezing the mixture. In some embodiments, the freezing includes directional freezing of the mixture through a temperature gradient. In some embodiments, the temperature gradient gradually decreases from the first end of the container to the second end of the container.

In some embodiments, the freezing results in the solidification of the mixture into the material.

In some embodiments, the methods of making the materials of the present disclosure occur in a continuous manner. For instance, in some embodiments, a mixture is continuously placed in a container and continuously extruded out of the container in order to continuously make the materials of the present disclosure for a certain amount of time.

In an additional aspect, the present disclosure pertains to a material. In some embodiments, the material includes one or more components. In some embodiments, the one or more components are in the form of a multi-layered structure.

DESCRIPTION OF THE DRAWINGS

FIG. 1C1 and FIG. 1C2 depict exemplary materials of the present disclosure.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Freeze-casting, the directional solidification of solutions, colloids, emulsions, gels, and slurries, is a technique for the manufacture of porous materials. However, with its current mold-based approach, the process has reached limitations which need to be overcome. Currently, a process with which slender materials and structures longer than 50 mm and 1-4 mm diameter made via freeze-cast methods with suitable microstructures and property gradients (e.g., compositional gradients, structural gradients, mechanical property gradients, and/or physical property gradients) is not available.

As such, a need exists for more effective systems and methods for making materials, such as, but not limited to, porous materials with uniform sizes and distributions. Various embodiments of the present disclosure address the aforementioned need.

Figure 1A:
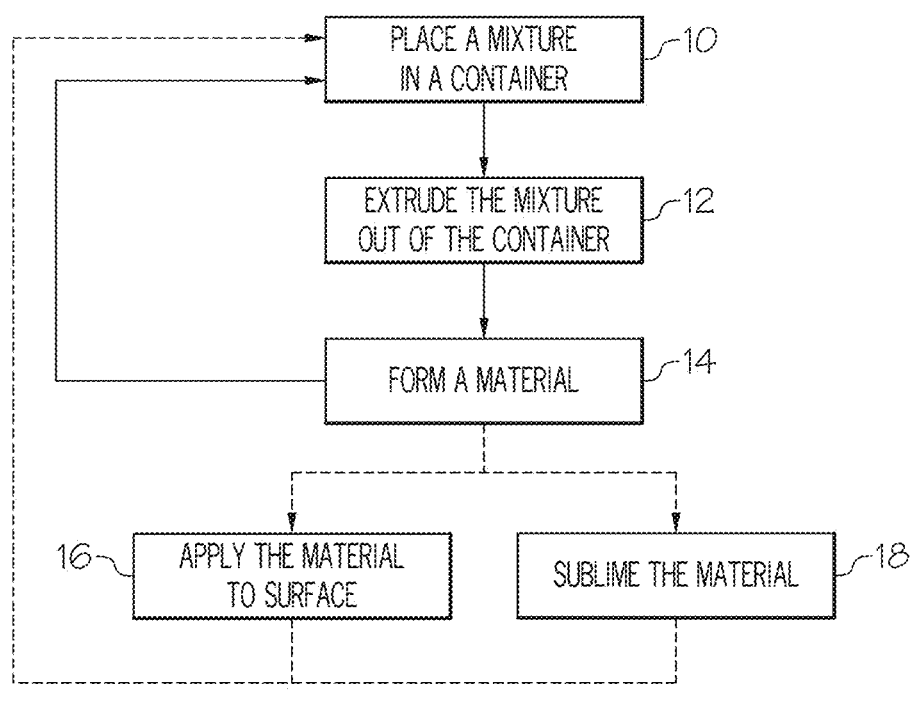
FIG. 1A depicts a method of making a material according to aspects of the present disclosure.

In some embodiments, the present disclosure pertains to a method of making materials. In some embodiments illustrated in FIG. 1A, the method of making the materials of the present disclosure can include one or more of the following steps of: placing a mixture with one or more components in a container (step 10), extruding the mixture out of the container (step 12), and forming a material from the mixture (step 14). In some embodiments, the materials may be applied to a surface as the materials exit the extruder (step 16). In some embodiments, the materials may be sublimed (e.g., lyophilized) (step 18).

In some embodiments, after the material is formed (step 14), the processes can be repeated until the desired amount of the material is formed or processed further. In some embodiments, the methods of making the materials of the present disclosure occur in a continuous manner. In particular embodiments, a mixture is continuously placed in a container and continuously extruded out of the container in order to continuously make the materials of the present disclosure for a certain amount of time.

The methods of the present disclosure can utilize various containers to make the materials of the present disclosure. For instance, in some embodiments illustrated in FIG. 1B, the containers of the present disclosure are in the form of container 20, which has a first end 22 and a second end 24 on opposite sides of one another. In this embodiment, second end 24 has at least one nozzle 26 that protrudes out of the second end. The at least one nozzle 26 has a first end 30 proximal to the second end 24, a second end 32 distal to the second end 24, and at least one opening 28 at second end 32. Additionally, the at least one nozzle 26 has a shorter length and a narrower diameter than container 20. In this embodiment, container 20 is filled with a mixture that has layers 34 and 36. In some embodiments, each layer has one or more components that are different from one or more components of other layers. In some embodiments, each layer has one or more components that are the same as one or more components of the other layers.

The methods of the present disclosure can utilize numerous containers to extrude mixtures. For instance, in some embodiments, container 20 illustrated in FIG. 1B may be utilized to extrude mixtures. In some embodiments, the mixture is extruded out of the at least one opening 28 of the at least one nozzle 26. In some embodiments, the extruding includes freezing the mixture during or after the extruding. In some embodiments, the freezing includes directional freezing of the mixture through a temperature gradient in the mixture. In some embodiments, the temperature gradient gradually decreases from first end 22 to second end 24 of container 20. In some embodiments, the temperature gradient gradually decreases from first end 30 to second end 32 of nozzle 26. In some embodiments, the freezing results in the solidification of the mixture into the material.

The methods of the present disclosure may form various types of materials. Additional embodiments of the present disclosure pertain to such materials. For instance, in some embodiments illustrated in FIG. 1C1 and FIG. 1C2, the materials of the present disclosure may be in the form of material 40 with layers 42 and 44, which are formed from the extrusion of layers 34 and 36 from container 20, respectively. In some embodiments where material 40 is sublimed (e.g., lyophilized), the materials of the present disclosure are in the form of material 40' with a single remaining layer 44'.

As set forth in more detail herein, the methods and materials of the present disclosure can have numerous embodiments. For instance, the methods for making the materials of the present disclosure can utilize various mixtures, components, containers, and nozzles. Moreover, the methods of making the materials of the present disclosure may utilize various extruding methods and freezing methods, or can further include additional steps, such as, but not limited to, application of the material to a surface (e.g., as the material exits the extruder), sublimation (e.g., lyophilization of the material), and combinations thereof. Additionally, the methods of the present disclosure can form various materials having various properties.

Methods of Making a Material

As set forth in further detail herein, an aspect of the present disclosure relates to methods of making a material. Such methods generally include one or more of the steps of: (1) placing a mixture in a container; and (2) extruding the mixture out of the container.

In some embodiments, the mixture includes one or more components. In some embodiments, the mixture includes a plurality of different components.

In some embodiments, the container has a first end and a second end. In some embodiments, the first end and the second end are on opposite sides of one another. In some embodiments, the second end of the container has at least one opening.

In some embodiments, the mixture is extruded out of the at least one opening. In some embodiments, the mixture includes a plurality of layers during the extruding. In some embodiments, each of the plurality of layers includes one or more components that are different from one or more components of other layers. In some embodiments, each of the plurality of layers includes one or more components that are the same as one or more components of the other layers.

In some embodiments, the extruding includes freezing the mixture. In some embodiments, the freezing results in the solidification of the mixture into the material.

Additionally, the methods of making the materials as disclosed herein can utilize various mixtures, components, containers, and openings. Moreover, the methods of making the materials of the present disclosure may utilize various extruding methods and freezing methods. Furthermore, the methods of the present disclosure can further include additional steps, such as, but not limited to, application of the material to a surface (e.g., as the material exits the extruder), sublimation (e.g., lyophilization) of the material, and combinations thereof.

Mixtures

As set forth in further detail herein, the methods of making the materials of the present disclosure can utilize various types of mixtures. For instance, in some embodiments, the mixture is in the form of a liquid, a solid, a gas, or combinations thereof. In some embodiments, the mixture may include a liquid, a solid, and an applied gas source (e.g., $CO_2$). In some embodiments, the mixture is in the form of a semi-frozen mixture, a partially frozen mixture, a semi-solidified mixture, an unfrozen mixture, a partially solidified mixture, and combinations thereof.

In some embodiments, the mixture is in the form of a slurry, a solution, a colloid, a gel, a suspension, a particle suspension, an emulsion, or combinations thereof. In some embodiments, the mixture is in the form of a solution. In some embodiments, the solution is a homogenous mixture (e.g., a homogenous solution, slurry, colloid, gel, suspension, particle suspension, emulsion, or combinations thereof). In some embodiments, the mixture is a heterogeneous mixture (e.g., a heterogeneous solution, slurry, colloid, gel, suspension, particle suspension, emulsion, or combinations thereof). In some embodiments, the mixture is in the form of a liquid oil in water-based mixture (e.g., a liquid oil in water-based solution). In some embodiments, the mixture is in the form of an emulsion.

In some embodiments, the mixture is in the form of a liquid and a solid. In some embodiments, the mixture is in the form of a slurry. In some embodiments, the mixture is in the form of a homogenous slurry. In some embodiments, the mixture is in the form of a heterogeneous slurry.

In some embodiments, the mixtures of the present disclosure have one or more solvents. In some embodiments, the one or more solvents include aqueous solvents, such as water-based solvents. In some embodiments, the one or more solvents include non-aqueous solvents. In some embodiments, the non-aqueous solvents include, without limitation, camphene, cyclohexane, dioxane, tert-butyl alcohol (TBA), dimethyl sulfoxide (DMSO), or combinations thereof.

Components

The mixtures of the present disclosure can include various components. For instance, in some embodiments, the component includes one or more components. In some embodiments, the one or more components include a single component.

In some embodiments, the one or more components include a plurality of different components. In some embodiments, the plurality of different components in a mixture are in the form of a plurality of layers during the extruding process. In some embodiments, each layer includes one or more components that are the same as one or more components in other layers. In some embodiments, each layer includes one or more components that are different from one or more components in other layers.

In some embodiments, each or one of the plurality of layers include a gradient. In some embodiments, the gradient includes a property gradient, a compositional gradient, a concentration gradient, a structural gradient, a mechanical property gradient, a physical property gradient, or combinations thereof. In some embodiments, the gradient includes a concentration gradient.

In some embodiments, the plurality of layers of the plurality of different components include different layers. In some embodiments, the different layers can be in various forms described previously. For instance, in some embodiments, each of the different layers can be in the form of liquid, solid, gas, semi-frozen mixtures, partially frozen mixtures, semi-solidified mixtures, unfrozen mixtures, partially solidified mixtures, or combinations thereof.

In some embodiments, the one or more components have the same freezing characteristics. In some embodiments, the one or more components have different freezing characteristics.

In some embodiments, the one or more components can include, without limitation, water, polymers, ceramics, metals, composites, particles, solid beads, hollow beads, platelets, flakes, fibers, fibrils, whiskers, tubes, hydrogels, capsules, hydrogel capsules, carbohydrates, mono-, di- and polysaccharides, lipids, peptides, proteins, blood, cells, biological factors, hormones, growth factors, viral vectors, antibacterial agents, stains, magnetic materials, piezoelectric materials, semiconductors, electrically conducive materials, thermally conductive materials, solutions thereof, colloids thereof, emulsions thereof, gels thereof, slurries thereof, ice particles thereof, ice crystals thereof, and combinations thereof.

In some embodiments, the one or more components include one or more metals. In some embodiments, the one or more metals include, without limitation, Al, Zr, Ti, V, Sr, Mg, Fe, Ni, Zn, Co, Cu, Ag, Au, Ca, Si, Gd, Cd, alloys thereof, oxides thereof, carbides thereof, nitrides thereof, and combinations thereof. In some embodiments, the one or more components include barium titanate, lead zirconate titanate, lithium niobate, or combinations thereof.

In some embodiments, the one or more components include rate earth elements, such a neodymium or samarium. In some embodiments, the one or more components include ferrite, Alnico, Sendust, AN, BN, SiC, or combinations thereof.

In some embodiments, the one or more components are polymers. In some embodiments, the polymer can include, without limitation, water soluble polymers, biopolymers, hydrogels, carbohydrates, mono-, di- and polysaccharides, lipids, peptides, proteins, nanocellulose, carboxymethyl cellulose, guar gum, xantham gum, alginate, agar, agarose, chitin, chitosan, chitosan-alginate, glucose, fructose, sucrose, trehalose, collagen, silk, keratin, polylactic acid (PLA), poly(glycolic acid) (PGA), polycaprolactone, polydioxanone, and combinations thereof.

In some embodiments, the polymers are in the form of slurries. In some embodiments, the polymers are in the form of suspensions. In some embodiments, the polymers are in the form of emulsions. In some embodiments, the polymers may be in an acid, such as acetic acids.

In some embodiments, the one or more components are particles. In some embodiments, the particles can include, without limitation, nanoparticles, microparticles, thermally conductive particles, electrically conductive particles, piezoelectric particles, magnetic particles, and combinations thereof.

In some embodiments, the particles include diameters that range from about 1 nanometer to about 100 micrometer. In some embodiments, the particles include diameters that range from about 1 nanometer to about 900 nm. In some embodiments, the particles include diameters of about 300 nanometer. In some embodiments, the particles include diameters of about 5 micrometer. In some embodiments, the particles include diameters of about 50 micrometer.

In some embodiments, the one or more components include antimicrobials. In some embodiments, the antimicrobials include antibacterial components. In some embodiments, the antimicrobials include antiviral components.

In some embodiments, the one or more components are blood. In some embodiments, the blood can include, without limitation, blood plasma, platelet-rich plasma, and combinations thereof.

In some embodiments, the one or more components are cells. In some embodiments, the cells are fat cells, Schwann cells, stem cells, microorganisms, or combinations thereof.

In some embodiments, the one or more components include viruses. In some embodiments, the one or more components includes viral vectors.

Containers

As set forth in further detail herein, the methods of making the materials of the present disclosure can utilize various types of containers. For instance, in some embodiments, the container is a component of a three-dimensional (3D) printer. In some embodiments, the container is attached to or associated with a three-dimensional printer. In some embodiments, the container is in the form of a syringe.

In some embodiments, the container can have various shapes. For instance, in some embodiments, the shapes can include, without limitation, a square shape, a circular shape, a cylindrical shape, a rectangular shape, a hexagonal shape, a concave shape, a convex shape, a tapered shape, and combinations thereof. In some embodiments, the containers of the present disclosure are in the form of container 20 shown in FIG. 1B.

In some embodiments, the containers of the present disclosure have a first end and a second end. In some embodiments, the second end contains the at least one opening. In some embodiments, the first end and the second end are on opposite sides of one another. In some embodiments, the first end and the second end have an angular relation to one another.

In some embodiments, the containers of the present disclosure have a length ranging from about 50 mm to about 80 mm. In some embodiments, the containers of the present disclosure have a diameter ranging from about 4 mm to about 15 mm

Openings

As set forth in further detail herein, the methods of making the materials of the present disclosure can utilize various types of openings. For instance, in some embodiments, the openings include at least one opening. In some embodiments, the at least one opening is a single opening. In some embodiments, the at least one opening is a plurality of openings. In some embodiments, the plurality of openings are co-axial to one another.

The openings of the present disclosure can be in various positions of a container. For instance, in some embodiments, the at least one opening is at the center of the second end of the container.

In some embodiments, the at least one opening is not at the center of the second end of the container. For instance, in some embodiments, the at least one opening is at an edge of a container.

The openings of the present disclosure can also have various shapes. For instance, in some embodiments, the opening shapes can include, without limitation, a circular shape, a square shape, a rectangular shape, and combinations thereof.

In some embodiments, the at least one opening is in the form of a needle. In some embodiments, the needle may have a tapered tip, a stainless steel tip, a poly tube flexible tip, a Teflon® lined tip, or combinations thereof. In some embodiments, the needle may have a length ranging from about 0.1 inches (2.5 mm) to about 2 inches (50 mm). In some embodiments, the needle may have an inner diameter ranging from about 0.004 inches (0.1 mm) to about 0.06 inches (1.54 mm).

In some embodiments, the opening is in the form of a nozzle. In some embodiments, the nozzle protrudes out of the second end of the container. In some embodiments, the nozzle has a first end proximal to the second end of the container and a second end distal to the second end of the container. In some embodiments, the nozzle has a shorter length and a narrower diameter than the container. In some embodiments, the second end of the nozzle has at least one opening.

The nozzles of the present disclosure can have various lengths. For instance, in some embodiments, the nozzles of the present disclosure have lengths ranging from about 0.1 mm to about 1 cm. In some embodiments, the nozzles of the present disclosure have lengths ranging from about 5 mm to about 50 mm. In some embodiments, the nozzles of the present disclosure have lengths ranging from about 12.7 mm to about 38.1 mm.

The nozzles of the present disclosure can also have various diameters. For instance, in some embodiments, the nozzles of the present disclosure have an inner diameter ranging from about 0.05 mm to about 2 mm. In some embodiments, the nozzles of the present disclosure have an inner diameter ranging from about 5 mm to about 50 mm. In some embodiments, the nozzles of the present disclosure have an inner diameter ranging from about 0.1 mm to about 10 mm. In some embodiments, the nozzles of the present disclosure have an inner diameter ranging from about 0.2 mm to about 1.55 mm.

Figure 1B:
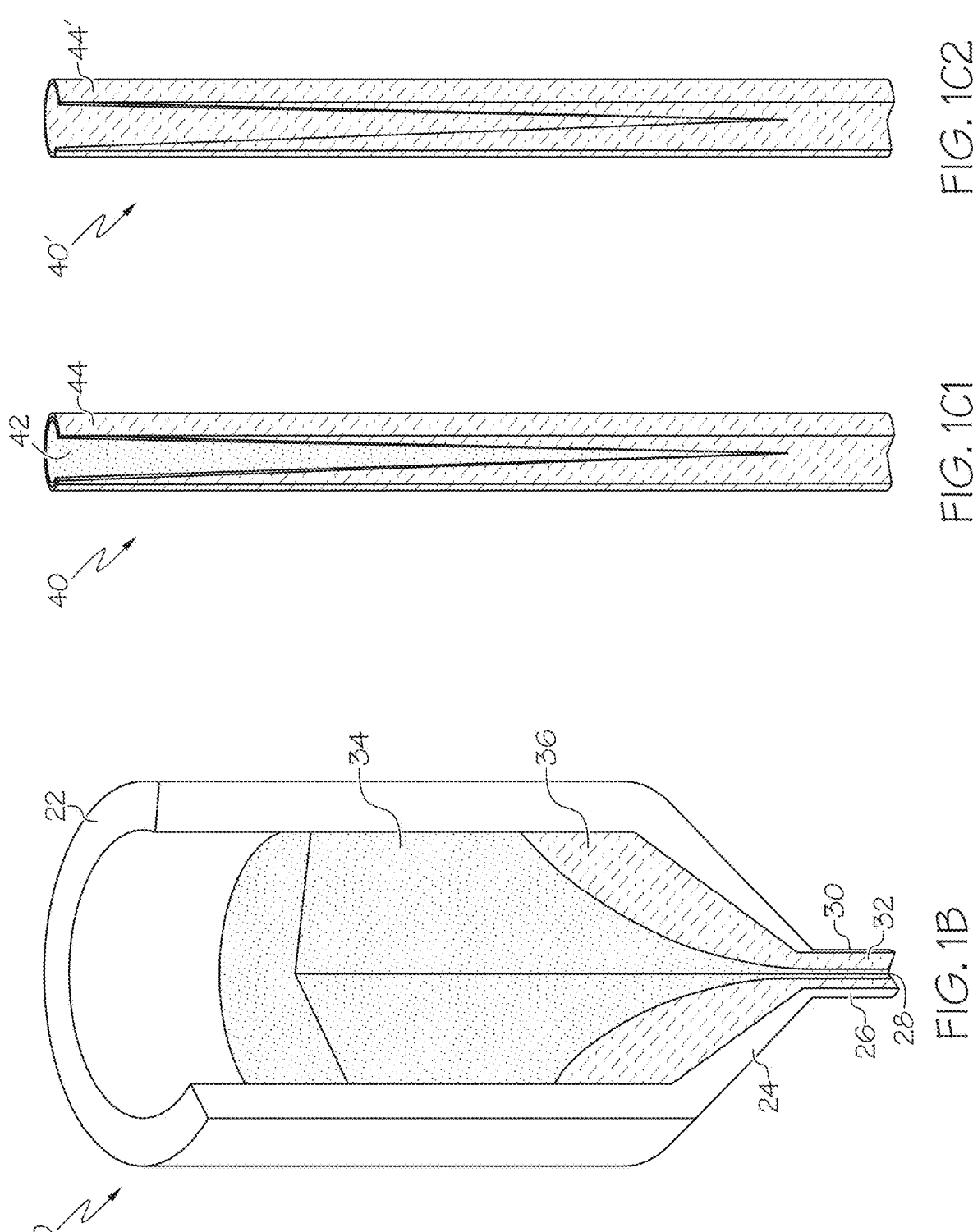
FIG. 1B illustrates a container suitable for making the materials of the present disclosure.

In some embodiments, the nozzles of the present disclosure are in the form of nozzle 26 shown in FIG. 1B. In some embodiments, the nozzles of the present disclosure are in the form of extrusion dies.

The nozzles and containers of the present disclosure can include various materials. For instance, in some embodiments, the nozzles and containers of the present disclosure can each independently include metals, polymers, ceramics, thermally conducting materials, thermally insulating materials, or combinations thereof.

Extruding

As set forth in further detail herein, the methods of making the materials of the present disclosure can utilize various methods of extruding. For instance, in some embodiments, extruding occurs by application of pressure to the container. In some embodiments, the pressure pushes the mixture out from the at least one opening. In some embodiments, the application of pressure is via a syringe. In some embodiments, the application of pressure is via a pump.

In some embodiments, the application of pressure is through a syringe pump, a standard pump, a piston, a plunger, or combinations thereof. In some embodiments, the application of pressure can be performed while controlling a flow rate (e.g., via a syringe pump). In some embodiments, the application of pressure can be performed while controlling the pressure (e.g., via a standard pump). In some embodiments, the application of pressure can be performed through the application of a force (e.g., through a plunger).

Freezing

As set for in further detail below, the methods of making materials of the present disclosure can utilize various methods of freezing. For instance, in some embodiments, the freezing occurs by freeze-casting, freeze drying, subliming, or combinations thereof. In some embodiments, the freezing occurs by freeze-casting.

Freezing of mixtures can occur through various mechanisms. For instance, in some embodiments, the freezing occurs by directional freezing of the mixture through a temperature gradient in the mixture, where the temperature gradient gradually decreases in the mixture from a first end of a container to a second end of the container. In some embodiments, freezing occurs by directional freezing of the mixture through a temperature gradient in the mixture, where the temperature gradient gradually decreases in the mixture from a first end of a nozzle to a second end of a nozzle.

In some embodiments, the temperature gradient is concentric within the mixture. In some embodiments, the temperature gradient is non-concentric within the mixture.

Freezing of mixtures can occur at various times. For instance, in some embodiments, the freezing occurs during the extruding of a mixture from a container. In some embodiments, the freezing occurs while the mixture exits an opening of the container. In some embodiments, the freezing occurs within the opening. In some embodiments, the freezing occurs after the mixture exits an opening of the container.

In some embodiments, the freezing occurs within at least one nozzle of a container. In some embodiments, the freezing occurs while the mixture exits the at least one nozzle. In some embodiments, the freezing occurs proximal to the at least one nozzle.

In some embodiments, the freezing occurs by applying a cooling source to a mixture of the present disclosure. In some embodiments, the cooling source does not contact the mixture or any components of the container (e.g., the openings or the nozzle). In some embodiments, the cooling source contacts the mixture, a component of the container (e.g., the openings or the nozzle), or combinations thereof. In some embodiments, the cooling source directly contacts the at least one opening. In some embodiments, the cooling source is in direct contact with the nozzle.

In some embodiments, the cooling source surrounds the nozzle. In some embodiments, the cooling source is in the form of a ring that surrounds the nozzle (e.g., the cooling ring shown in FIG. 2D).

In some embodiments, the application of the cooling source to the mixture occurs by applying the cooling source to at least one opening of a container. In some embodiments, the application of the cooling source to the mixture occurs by applying the cooling source to at least one nozzle. In some embodiments, the cooling source is utilized to generate a uniform temperature through the at least one nozzle. In some embodiments, the cooling source is utilized to generate a temperature gradient through the at least one nozzle.

In some embodiments, the cooling source can include, without limitation, dry ice, liquid nitrogen, FREON, a chilling block, cooling rings, surface-coated cooling rings, and combinations thereof. In some embodiments, the cooling source includes one or more chilling blocks. In some embodiments, the cooling source is in the form of chilling blocks, such as copper chilling blocks.

In some embodiments, the cooling source cools the mixture through concentric cooling. In some embodiments, the cooling source cools the mixture through linear cooling.

In some embodiments, the cooling source includes a plurality of cooling sources (e.g., a plurality of chilling blocks). In some embodiments, the plurality of cooling sources are positioned at different regions of a container or a nozzle in order to create a temperature gradient in the mixture. For instance, in some embodiments, a plurality of cooling sources are placed at the first and second ends of a container in order to create a temperature gradient in the mixture between the first end and the second end of the container. In some embodiments, a plurality of cooling sources are placed at the first and second ends of a nozzle in order to create a temperature gradient in the mixture between the first end and the second end of the nozzle.

In some embodiments, the methods of the present disclosure also include a step of controlling a temperature of the container. In some embodiments, a temperature of the container can be controlled before, during and/or after the extruding process. In some embodiments, the temperature of the container can be controlled spatially, temporally, or combinations thereof.

In some embodiments, controlling a temperature of the container includes controlling the temperature of a nozzle associated with the container (e.g., spatially and/or temporally). In some embodiments, controlling a temperature of the container includes controlling a temperature profile within the container (e.g., spatially and/or temporally). In some embodiments, controlling a temperature of the container includes controlling a temperature profile along a nozzle of the container (e.g., spatially and/or temporally). In some embodiments, controlling a temperature of the container includes controlling the temperature gradient of the container or a nozzle of the container (e.g., spatially and/or temporally). In some embodiments, controlling a temperature of the container includes controlling a profile of the temperature gradient of the container or a nozzle of the container (e.g., spatially and/or temporally).

Various methods may be utilized to control a temperature of a container. For instance, in some embodiments, the temperature of the container is controlled by controlling the temperature of one or more cooling sources associated with the container. For instance, in some embodiments, the temperature of one or more cooling sources can be controlled to define an applied temperature gradient spatially and/or temporally. In some embodiments, the temperature of one or more cooling sources can be controlled to define the profile of a temperature gradient spatially and/or temporally.

Application to a Surface

As set forth in further detail herein, the methods of making the materials of the present disclosure can include the additional step of applying the material to a surface. For instance, in some embodiments, the application occurs as the material exits the extruder. In some embodiments, the application occurs after extrusion. In some embodiments, the application is direct application. In some embodiments, the application can occur through various methods. For instance, in some embodiments, the application can occur via dropping, pouring, brushing, spraying, and freeze-spraying, and combinations thereof. In some embodiments, the surface is a cold surface. In some embodiments, the cold surface maintains the materials of the present disclosure in a frozen state.

In some embodiments, the surface of the materials of the present disclosure are coated with an additional material. In some embodiments, the coating occurs after the materials are extruded. For instance, in some embodiments, the application can occur via spraying, brushing, freeze-spraying, dipping, and combinations thereof.

Sublimation

In some embodiments, the methods of making the materials of the present disclosure can include the additional step of subliming the material. For instance, in some embodiments, the materials are sublimed after they exit an opening of a container. In some embodiments, the sublimation removes one or more additives or impurities from the material. In some embodiments, the sublimation removes one or more of the one or more components from the material (e.g., water). In some embodiments, the sublimation forms a hollow cavity within the material. In some embodiments, the hollow cavity has a non-uniform diameter. In some embodiments, the hollow cavity has a graded diameter. In some embodiments, the graded diameter becomes narrower from one end of the material to another end of the material.

Sublimation can occur by various methods. For instance, in some embodiments, sublimation can occur by methods that include, without limitation, lyophilization, freeze-drying, evaporation, or combinations thereof. In some embodiments, sublimation occurs by evaporation.

Materials

As set forth in further detail herein, the methods of the present disclosure can form various materials having various properties. Additional embodiments of the present disclosure pertain to the materials.

In some embodiments, the materials of the present disclosure include one or more components. In some embodiments, the one or more components are in the form of a multi-layered structure.

Components

As detailed herein, the materials of the present disclosure can include various components such as those outlined above in detail. For instance, in some embodiments, the components are one or more components. In some embodiments, the one or more components are a single component. In some embodiments, the one or more components are a plurality of different components. In some embodiments, the one or more components have the same freezing characteristics. In some embodiments, the one or more components have different freezing characteristics.

In some embodiments, the one or more components can include, without limitation, water, polymers, ceramics, metals, composites, particles, solid beads, hollow beads, platelets, flakes, fibers, fibrils, whiskers, tubes, hydrogels, capsules, hydrogel capsules, carbohydrates, mono-, di- and polysaccharides, lipids, peptides, proteins, blood, cells, biological factors, hormones, growth factors, viral vectors, antibacterial agents, stains, magnetic materials, piezoelectric materials, semiconductors, electrically conducive materials, thermally conductive materials, solutions thereof, colloids thereof, emulsions thereof, gels thereof, slurries thereof, ice particles thereof, ice crystals thereof, and combinations thereof.

In some embodiments, the one or more components are polymers. In some embodiments, the polymer can include, without limitation, water soluble polymers, biopolymers, hydrogels, carbohydrates, mono-, di- and polysaccharides, lipids, peptides, proteins, nanocellulose, carboxymethyl cellulose, guar gum, xantham gum, alginate, agar, agarose, chitin, chitosan, chitosan-alginate, glucose, fructose, sucrose, trehalose, collagen, silk, keratin, polylactic acid (PLA), poly(glycolic acid) (PGA), polycaprolactone, polydioxanone, and combinations thereof.

In some embodiments, the one or more components are particles. In some embodiments, the particles can include, without limitation, nanoparticles, microparticles, thermally conductive particles, electrically conductive particles, piezoelectric particles, magnetic particles, and combinations thereof.

In some embodiments, the particles include diameters that range from about 1 nanometer to about 100 micrometer. In some embodiments, the particles include diameters that range from about 1 nanometer to about 900 nm. In some embodiments, the particles include diameters of about 300 nanometer. In some embodiments, the particles include diameters of about 50 micrometer.

In some embodiments, the one or more components are blood. In some embodiments, the blood can include, without limitation, blood plasma, platelet-rich plasma, and combinations thereof.

In some embodiments, the one or more components are cells. In some embodiments, the cells are fat cells, Schwann cells, stem cells, microorganisms, or combinations thereof.

In some embodiments, the one or more components include viruses. In some embodiments, the one or more components includes viral vectors.

In some embodiments, the one or more components have various alignments. For instance, in some embodiments, the one or more components are uniformly aligned. In some embodiments, the one or more components are angularly aligned. In some embodiments, the alignment is in the direction of flow and/or ice crystals.

Properties

The materials of the present disclosure can have various properties, such as those outlined above in detail. For instance, in some embodiments, the material has a hollow cavity within the material. In some embodiments, the hollow cavity has a non-uniform diameter. In some embodiments, the hollow cavity has a graded diameter. In some embodiments, the graded diameter becomes narrower from one end of the material to another end of the material.

In some embodiments, the one or more components of the material are uniformly aligned. In some embodiments, the one or more components of the material are angularly aligned.

In some embodiments, the material is in the form of a solid, a semi-solid, gels, and combinations thereof. In some embodiments, the materials have uniform dimensions. In some embodiments, the materials are three-dimensional.

In some embodiments, the materials have a hierarchical architecture. In some embodiments, the material has an outer layer and an inner layer. In some embodiments, the material has multiple outer layers and multiple inner layers.

In some embodiments, the material is porous. In some embodiments, the material has uniform pore sizes. In some embodiments, 50% of pores have the same size. In some embodiments, 60% of pores have the same size. In some embodiments, 75% of pores have the same size. In some embodiments, 85% of pores have the same size.

The materials of the present disclosure can have various pore sizes. For instance, in some embodiments, the material has microscopic pores (e.g., pores with diameters between 1 and 500 micrometers), macropores (e.g., pores with diameters larger than 50 nm), mesopores (e.g., pores with diameters between 2 and 50 nm), micropores (e.g., pores with diameters less than 2 nm), nanopores (e.g., pores with nanometer sized diameters), and combinations thereof.

In some embodiments, the materials of the present disclosure have varying porosities. For instance, in some embodiments, the porosity of the materials of the present disclosure can vary from nanopores to microscopic pores.

In some embodiments, the porosity of the materials of the present disclosure can vary in a hierarchical manner. For instance, in some embodiments, the materials of the present disclosure have a hierarchical architecture that encompasses microscopic pores, macropores, mesopores, micropores, nanopores, and combinations thereof.

In some embodiments, the materials of the present disclosure have a plurality of layers with different porosities within each layer. In some embodiments, one or more of each of the layers may have regions (e.g., cell walls or lattices or lattice struts) with different porosities. For instance, in some embodiments, the pore size within a layer, of which the regions (e.g., cell walls or lattices) are composed, is smaller than that within the regions (e.g., cell walls or lattices or lattice struts) of the layers. In some embodiments, the pores within the regions (e.g., cell walls or lattices or lattice struts) are smaller than pore sizes between each of the regions.

In some embodiments, a majority of the material includes uniform pore sizes. For instance, in some embodiments, at least 50% of the surface area of the material includes uniform pore sizes. In some embodiments, at least 60% of the surface area of the material includes uniform pore sizes. In some embodiments, at least 70% of the surface area of the material includes uniform pore sizes. In some embodiments, at least 80% of the surface area of the material includes uniform pore sizes. In some embodiments, at least 90% of the surface area of the material includes uniform pore sizes. In some embodiments, at least 95% of the surface area of the material includes uniform pore sizes.

In some embodiments, the material is in the form of rods, graded rods, tubes, scaffolds, composites, and combinations thereof. In some embodiments, the material is in the form of scaffolds.

In some embodiments, the material has one or more gradients along a length, across a section, or combinations thereof. In some embodiments, the gradient includes a property gradient, a compositional gradient, a concentration gradient, a structural gradient, a mechanical property gradient, a physical property gradient, or combinations thereof.

In some embodiments, the material has a diameter of less than about 100 mm. In some embodiments, the material has a diameter of less than about 75 mm. In some embodiments, the material has a diameter of less than about 50 mm. In some embodiments, the material has a diameter of less than about 25 mm. In some embodiments, the material has a diameter of less than about 10 mm. In some embodiments, the material has a diameter of less than about 5 mm. In some embodiments, the material has a diameter between about 1 mm to about 4 mm. In some embodiments, the material has a diameter of less than about 1 mm.

In some embodiments, the material has a length of more than about 5 mm. In some embodiments, the material has a length of more than about 10 mm. In some embodiments, the material has a length of more than about 25 mm. In some embodiments, the material has a length of more than about 35 mm. In some embodiments, the material has a length of more than about 50 mm. In some embodiments, the material has a length of more than about 75 mm. In some embodiments, the material has a length of more than about 100 mm. In some embodiments, the material has a length of more than about 200 mm. In some embodiments, the material has a length of more than about 300 mm.

In some embodiments, the materials are homogenous. In some embodiments, the materials have no layers. In some embodiments, the materials are graded. In some embodiments, the materials are multi-layered. In some embodiments, the materials exhibit a hierarchical architecture. In some embodiments, the materials include a random distribution.

In some embodiments, the materials of the present disclosure have one or more property gradients. In some embodiments, the one or more property gradients span across a length of the material. In some embodiments, the one or more property gradients span across a width of the material. In some embodiments, the one or more property gradients include, without limitation, compositional gradients, structural gradients, mechanical property gradients, and physical property gradients. In some embodiments, the one or more gradients include a concentration gradient.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

EXAMPLE 1. CONTINUOUS MANUFACTURE OF HOMOGENEOUS AND GRADED RODS BY LOW-TEMPERATURE EXTRUSION

This Example describes the continuous manufacture of homogenous and graded rods by low temperature extrusions according to aspects of the present disclosure.

Freeze-casting, the directional solidification of solutions, colloids, emulsions, gels, and slurries, is a technique for the manufacture of porous materials. However, with its current mold-based approach, the process has reached limitations which need to be overcome. Needed is a process with which slender materials and structures longer than 50 mm and 1-4 mm diameter can be freeze-cast with suitable microstructures and mechanical properties for numerous applications.

A low-temperature extrusion system has been developed for this purpose and is demonstrated in this Example. With it, the manufacture of slender rods of uniform or graded structures and compositions can be extruded in a continuous processing approach. The length of rods produced and the graded features achieved are currently unobtainable by any other method of manufacture. Highlighted are three samples types: rods with a uniform structure and properties, and rods with graded properties, both through-thickness and along the length composed of two or three compositions. The principles of structure formation are explained and illustrated herein.

Figure 2A:
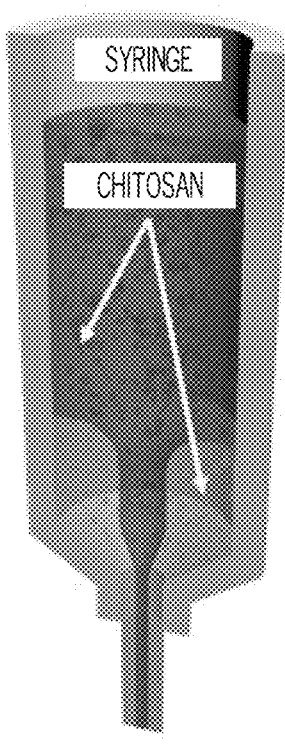
FIG. 2A illustrates a schematic of flow for the manufacture of graded scaffolds.
Figure 2B:
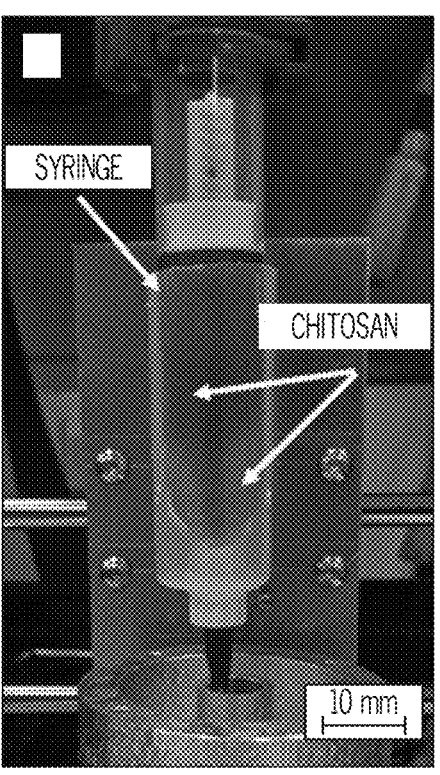
FIG. 2B illustrates a syringe connected to a pump and feeding into a cold ring.
Figure 2C:
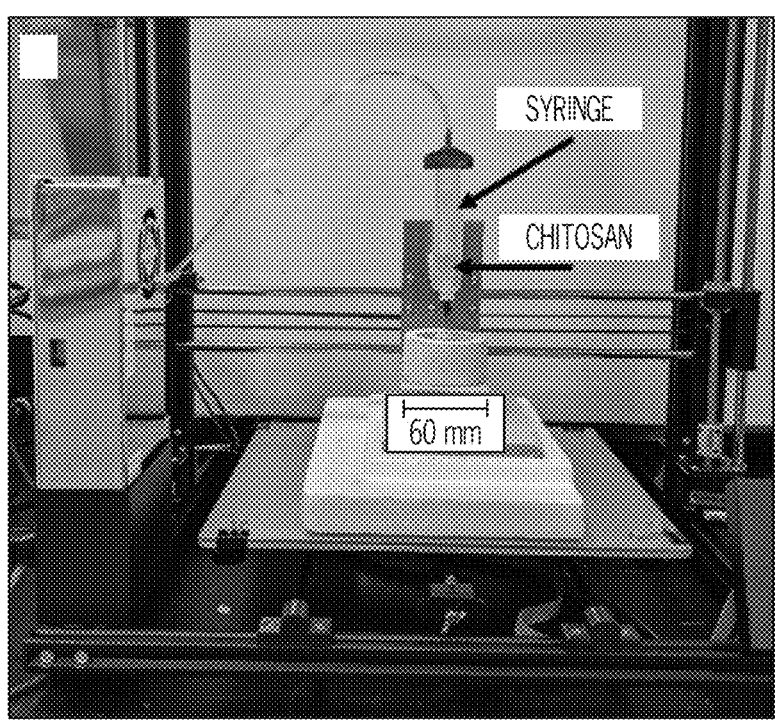
FIG. 2C illustrates a three-dimensional (3D) printer modified for low temperature extrusion.
Figure 2D:
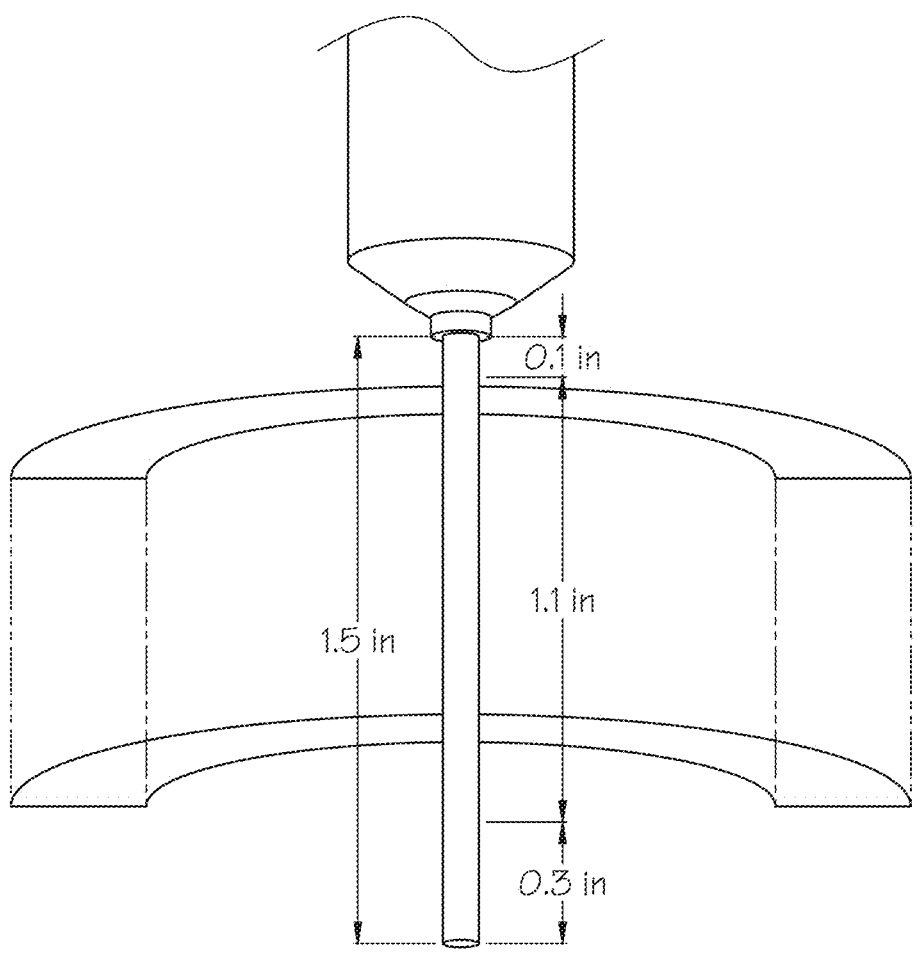
FIG. 2D illustrates an expanded view of the syringe and cold ring in FIG. 2B. The inner nozzle diameter is 0.06 inches (1.54 mm) while the outer nozzle diameter is 0.072 inches (1.83 mm).

FIG. 2A illustrates a schematic of flow for the manufacture of graded scaffolds. FIG. 2B illustrates a syringe connected to a pump and feeding into a cold ring. FIG. 2C illustrates a three-dimensional (3D) printer modified for low temperature extrusion. FIG. 2D illustrates an expanded view of the syringe and cold ring in FIG. 2B.

Figure 3B:
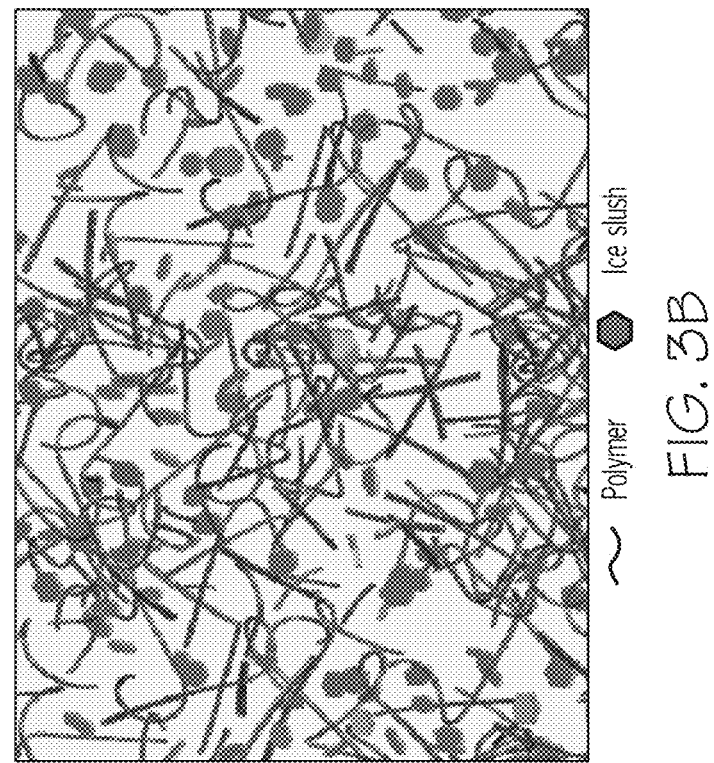
FIG. 3A, FIG. 3B, and FIG. 3C illustrate that not only polymer solutions, but also "slush" (half-frozen) solutions or slurries can be extruded and solidified during the extrusion process.
Figure 3A:
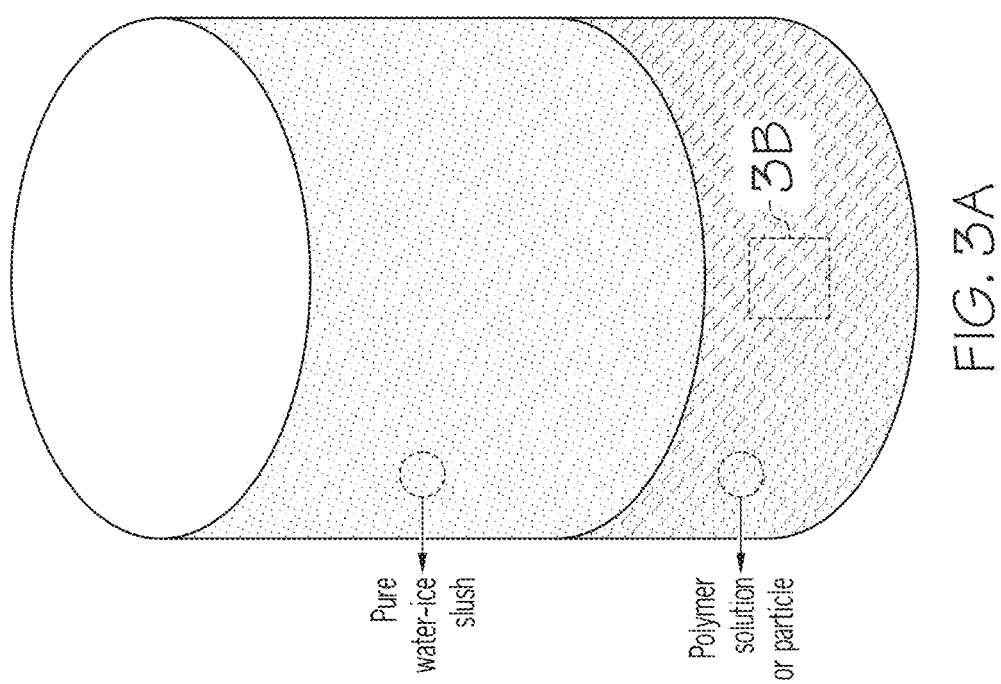
Figure 3C:
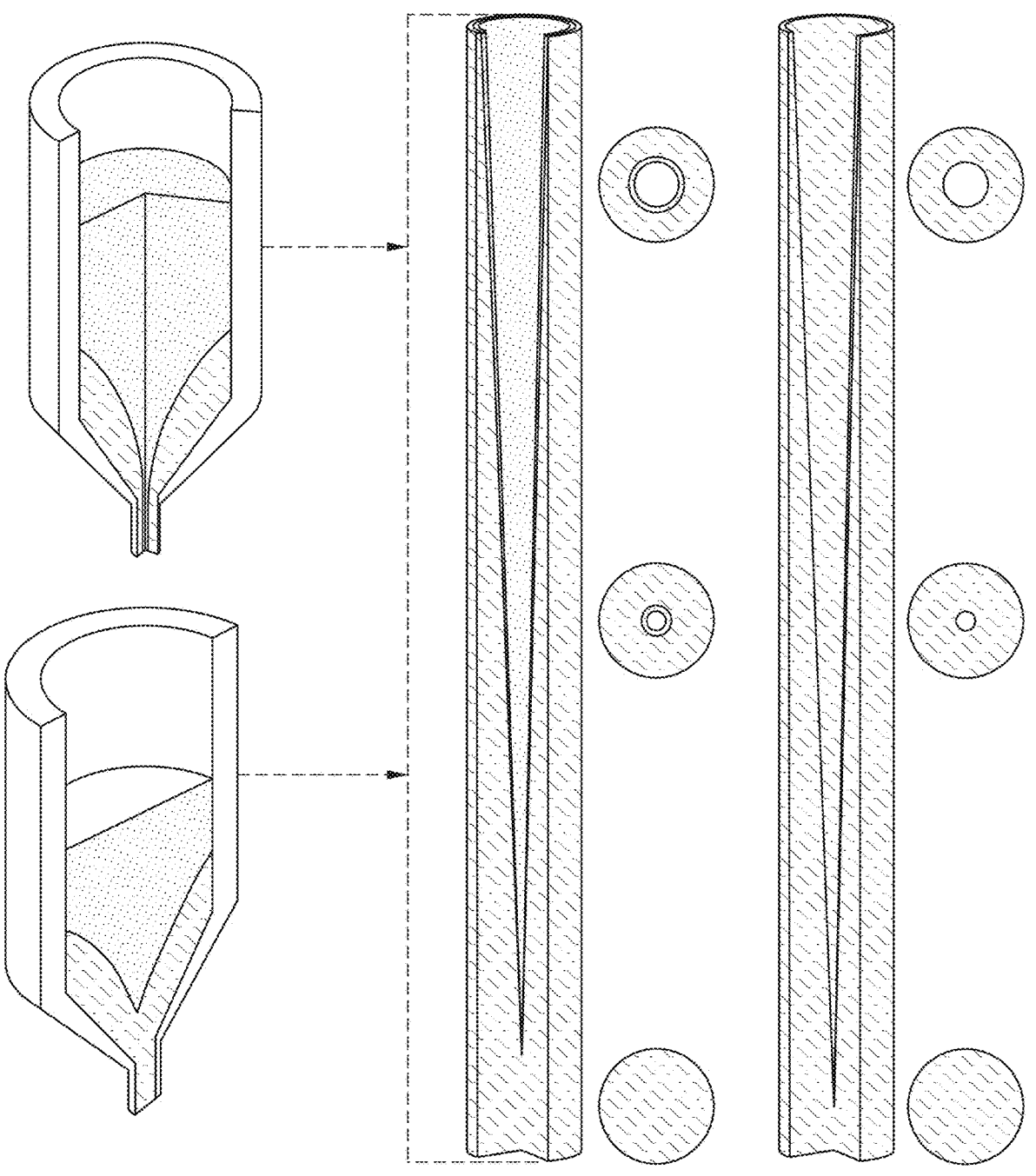

FIGS. 3A, 3B and 3C illustrate that not only polymer solutions, but also "slush" (partially-frozen) solutions, colloids, emulsions, gels, or slurries can be extruded and solidified during the extrusion process. If one of the components is water-based, a hollow cylinder results after lyophilization.

FIGS. 4A, 4B, 4C, and 4D illustrate longitudinal cross-sections of extrudites without (FIG. 4A) and with (FIGS. 4B, 4C, and 4D) property gradients of the following compositions: 4% (w/v) chitosan (FIG. 4A), 4% (w/v) (FIG. 4B), and 8% (w/v) (FIG. 4C) three-component chitosan (colored white and green) with property gradient along the length, and 4% (w/v) (FIG. 4D) three-component chitosan (colored white, green, and blue) with both a radial (through the thickness) and a longitudinal property gradient.

Figures 4A, 4B, 4C, 4D:
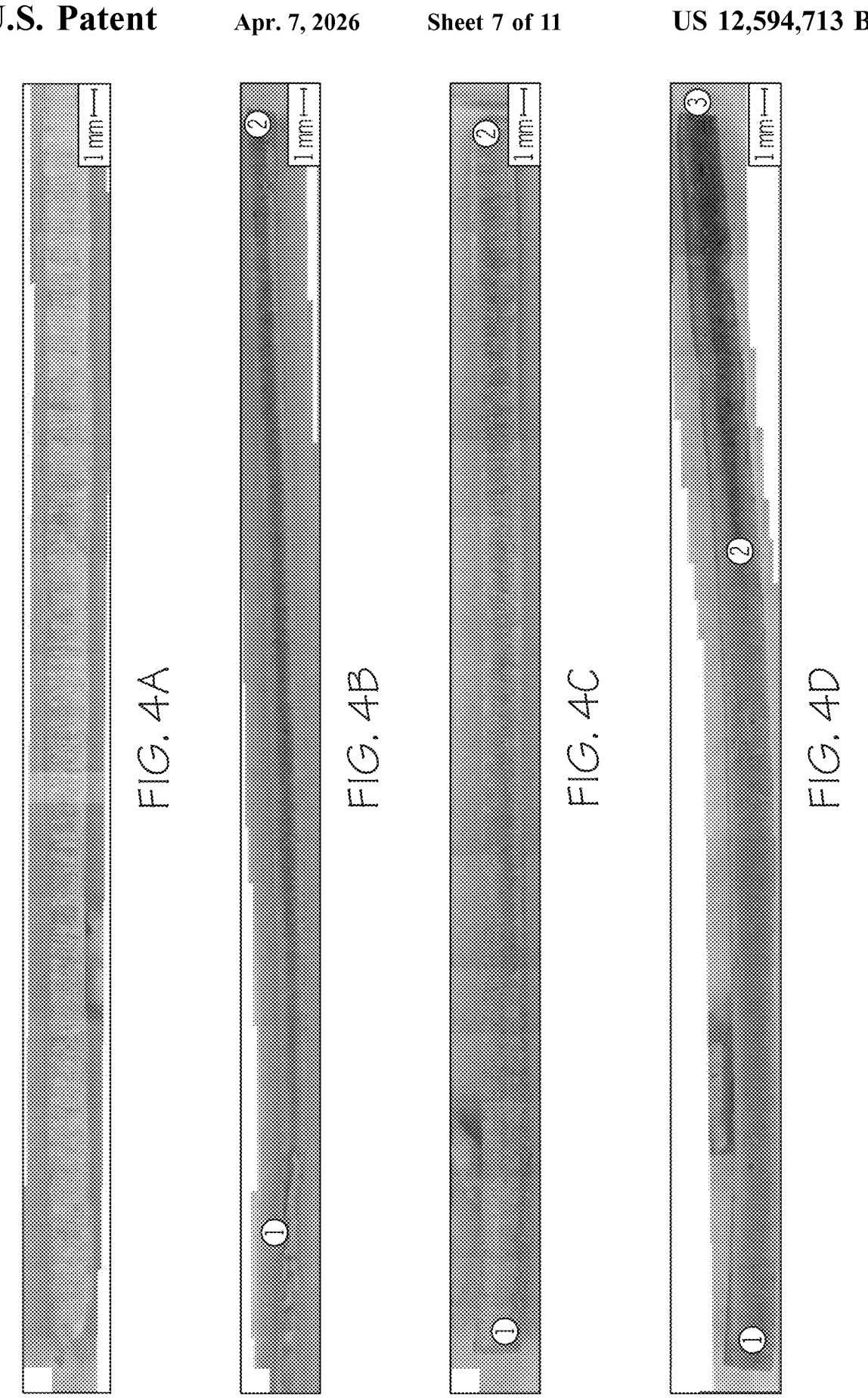
FIG. 4A, FIG. 4B, FIG. 4C, and FIG. 4D illustrate longitudinal cross-sections of extrudites without (FIG. 4A) and with (FIGS. 4B, 4C, and 4D) property gradients of the following compositions: 4% (w/v) (FIG. 4A), 4% (w/v) (FIG. 4B), and 8% (w/v) (FIG. 4C) three-component chitosan with a property gradient along the length, and 4% (w/v) (FIG. 4D) three-component chitosan with both a radial (through the thickness) and a longitudinal property gradient.
Figure 5:
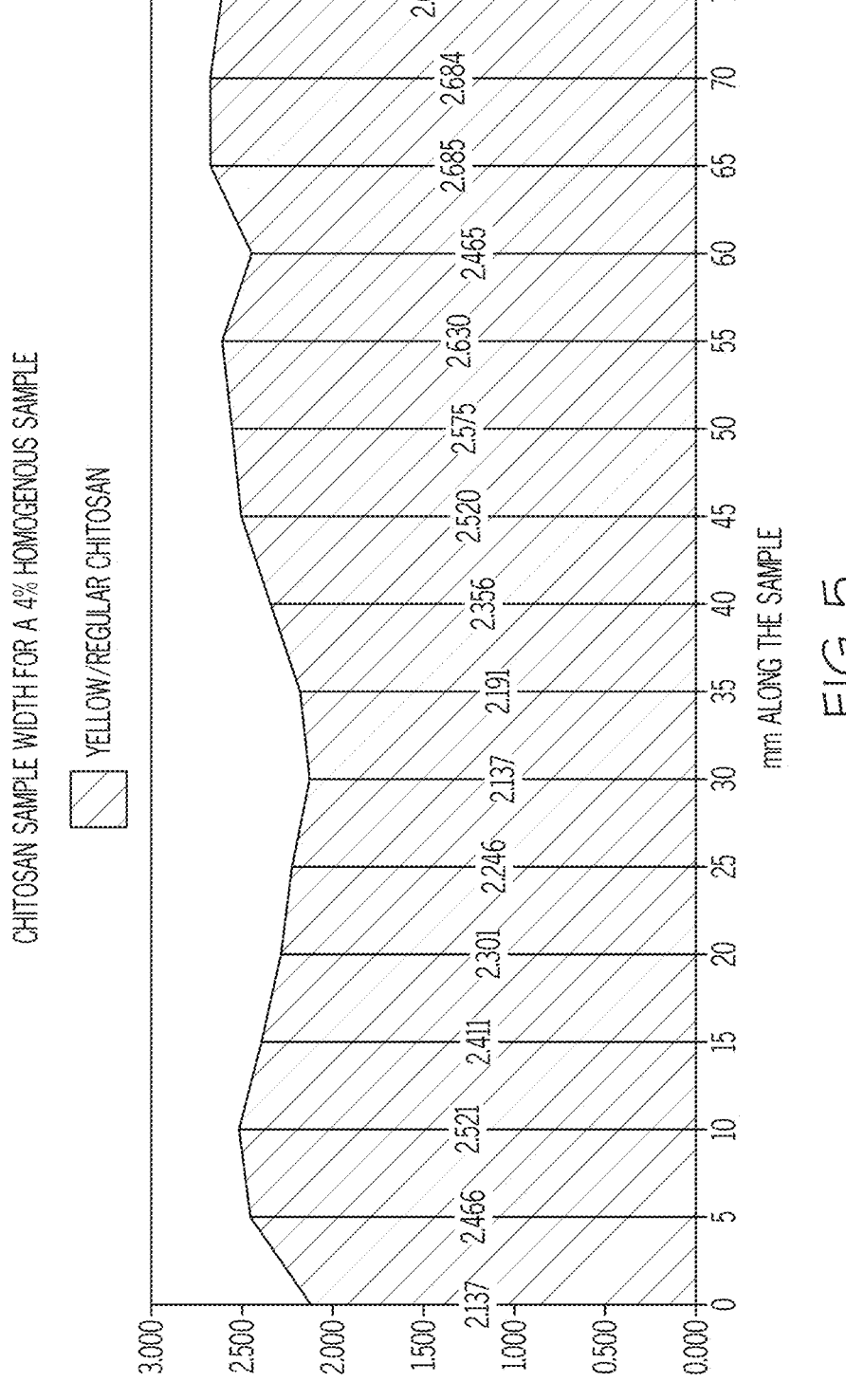
FIG. 5 illustrates dimensions along the length of the pure 4% (w/v) chitosan extrudite shown in FIG. 4A.
Figure 6:
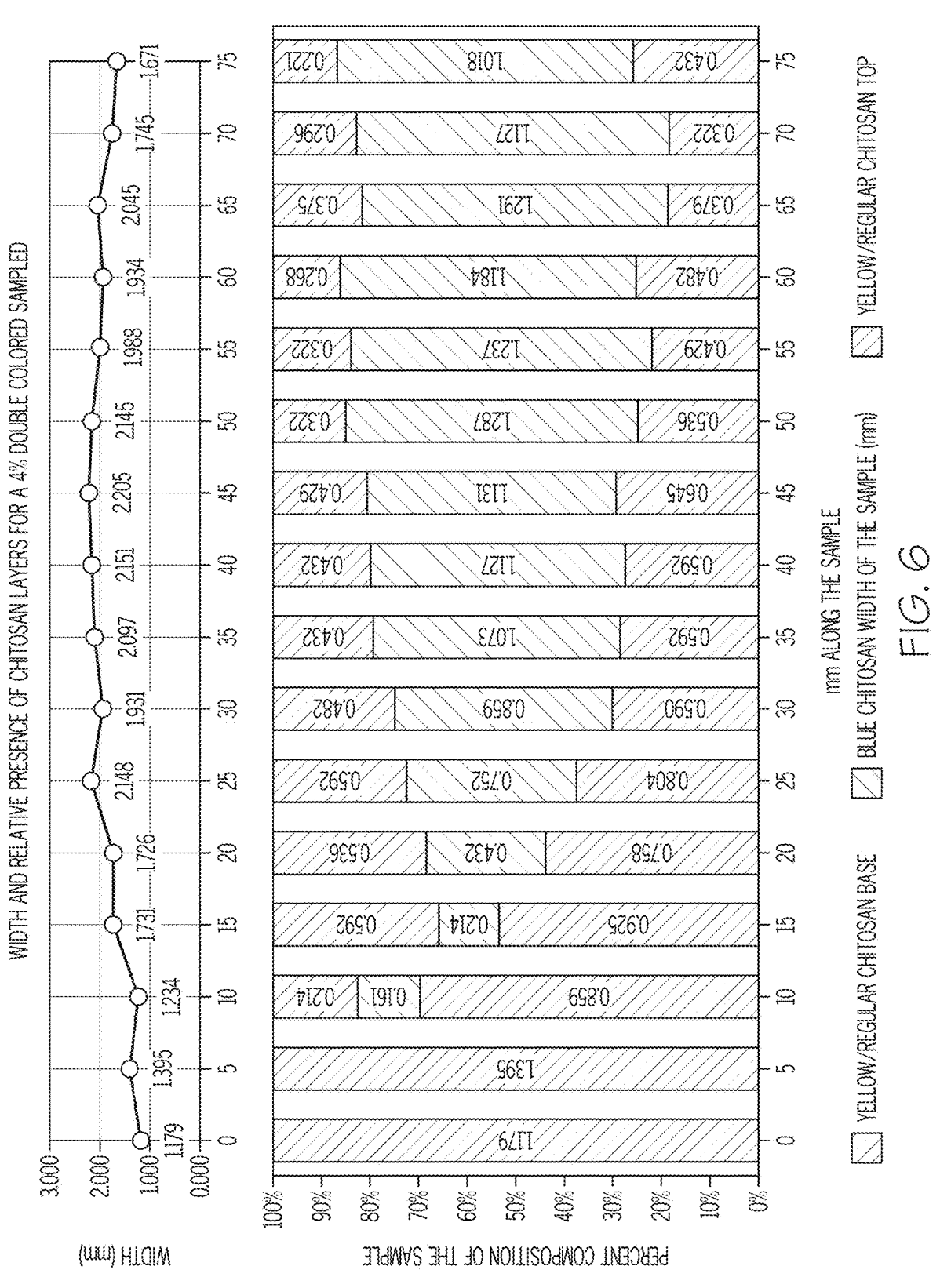
FIG. 6 illustrates dimensions and phase distribution along the length of the two-composition 4% (w/v) chitosan extrudite shown in FIG. 4B.
Figure 7:
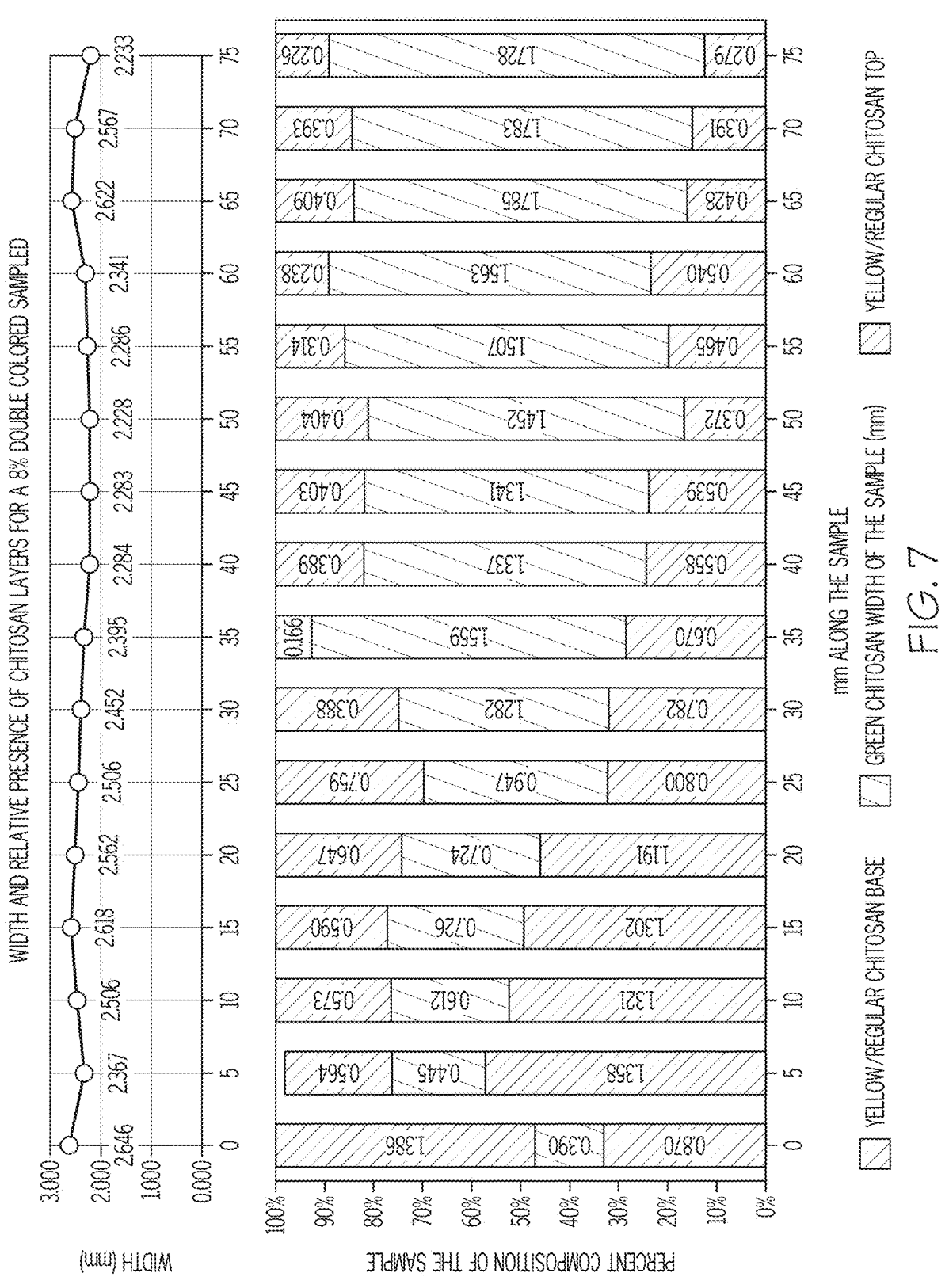
FIG. 7 illustrates dimensions and phase distribution along the length of the two-composition 8% (w/v) chitosan extrudite shown in FIG. 4C.
Figure 8:
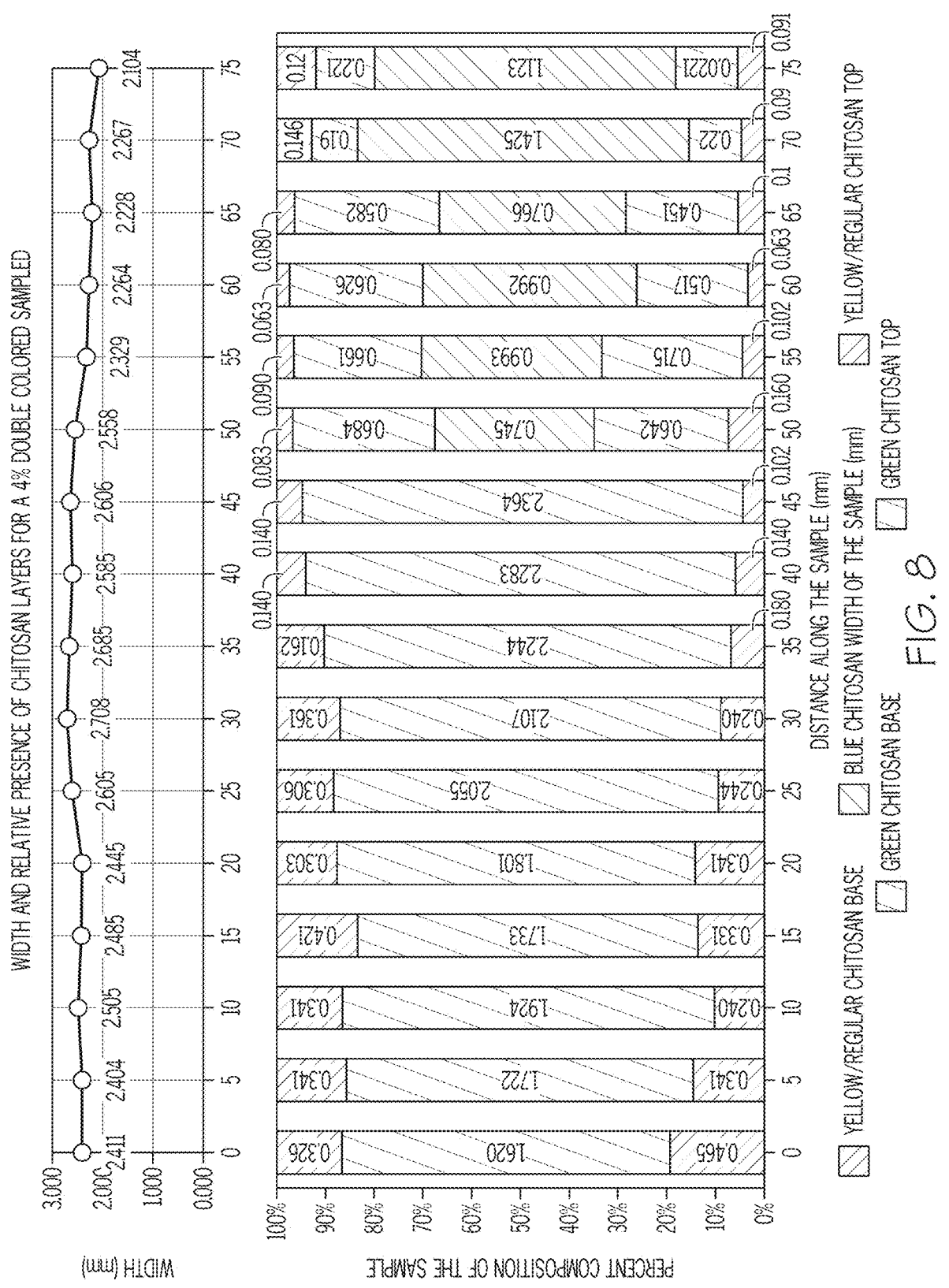
FIG. 8 illustrates width and relative presence of chitosan layers for a 4% treble colored sample shown in FIG. 4D.

FIG. 5 illustrates dimensions along the length of the pure 4% (w/v) chitosan extrudite shown in FIG. 4A. FIG. 6 illustrates dimensions and phase distribution along the length of the two-composition 4% (w/v) chitosan extrudite shown in FIG. 4B. FIG. 7 illustrates dimensions and phase distribution along the length of the two-composition 8% (w/v) chitosan extrudite shown in FIG. 4C. FIG. 8 illustrates dimensions and phase distribution along the length of the three-composition 4% (w/v) chitosan extrudite shown in FIG. 4D.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of making a material, the method comprising:
applying a temperature gradient to a mixture comprising a plurality of layers, each layer independently composed of one or more different components creating a compositional gradient in an at least one nozzle or syringe, independently extruding a same mixture or a compositionally different mixture out of the at least one nozzle or syringe under conditions to apply the same temperature gradient or a different temperature gradient, together the extruding and temperature gradient conditions result in freeze-casting the mixture from each of the at least one nozzle or syringe to produce an extruded material having a nozzle or syringe formed compositional gradient, and a property gradient selected from at least one of a mechanical property gradient, a physical property gradient, a structural gradient, or combinations thereof; and
controlling the same or a different temperature gradient of the mixture before and during the extruding, and optionally after, through the at least one nozzle or syringe, for spatially directing an ordered crystal formation in the extruded material, wherein the extruded material is a plurality of graded layers.

2. The method of claim 1, further comprising placing the mixture in a container having a first end for receiving the mixture, and the at least one nozzle or syringe on a second end of the container.

3. The method of claim 1, wherein the mixture is in the form of a solution, a colloid, a gel, a slurry, a suspension, a particle suspension, an emulsion, a slush, or combinations thereof.

4. The method claim 1, wherein the plurality of different components are selected from water, solvents, polymers, ceramics, metals, composites, particles, solid beads, hollow beads, platelets, flakes, fibers, fibrils, whiskers, tubes, hydrogels, capsules, hydrogel capsules, carbohydrates, monosaccharides, disaccharides and polysaccharides, lipids, peptides, proteins, blood, cells, biological factors, hormones, growth factors, viral vectors, antibacterial agents, stains, magnetic materials, piezoelectric materials, semiconductors, electrically conductive materials, thermally conductive materials, solutions thereof, colloids thereof, gels thereof, slurries thereof, ice particles thereof, ice crystals thereof, solidified mixture thereof, and combinations thereof.

5. The method of claim 1, wherein the freezing comprises directional freezing of the mixture through the temperature gradient in the mixture, wherein the temperature gradient is concentric with respect to the direction of the extruding.

6. The method of claim 1, wherein the freezing occurs within the at least one nozzle or syringe.

7. The method of claim 1, wherein the freezing occurs during the extruding, while the mixture exits the at least one nozzle or syringe, and after the mixture exits the at least one nozzle or syringe.

8. The method of claim 1, wherein the freezing occurs by exposure of the mixture to a cooling source.

9. The method of claim 1, wherein a cooling source does not contact the mixture or a component of the at least one nozzle or syringe, or a container.

10. The method of claim 1, wherein a cooling source directly contacts the at least one nozzle or syringe, or a container.

11. The method of claim 1, wherein a cooling source comprises a plurality of cooling units positioned at different regions around the at least one nozzle or syringe, or a container, to create the temperature gradient in the mixture.

12. The method of claim 2, wherein the at least one nozzle or syringe has a shorter length and a narrower diameter than the container.

13. The method of claim 1, wherein the property gradient is a longitudinal gradient with respect to the direction of the extruding and a radial gradient with respect to the direction of the extruding, or a radial gradient with respect to the direction of the extruding.

14. The method of claim 1, further comprising applying the temperature gradient to the mixture as the mixture exits the extruder to a surface.

15. The method of claim 1, further comprising removing solvent from the extruded material.

16. The method of claim 15, wherein the solvent is removed by subliming.

17. The method of claim 16, wherein the subliming forms a hollow cavity within the extruded material and the hollow cavity comprises a non-uniform diameter.

18. The method of claim 17, wherein the hollow cavity comprises a graded diameter, and wherein the graded diameter becomes narrower from a first end of the extruded material to a second end of the extruded material.

19. The method of claim 1, wherein the method is performed continuously, and wherein the mixture is continuously extruded for a certain amount of time.

20. The method of claim 1, wherein the ordered crystal formation of the extruded material creates and controls a porosity of the extruded material.

21. The method of claim 1, wherein the extruded material has a closed cell wall structure or an open cell wall structure.

* * * * *